(No Model.)
G. W. MILLER.
POCKET KNIFE.
No. 589,737. Patented Sept. 7, 1897.
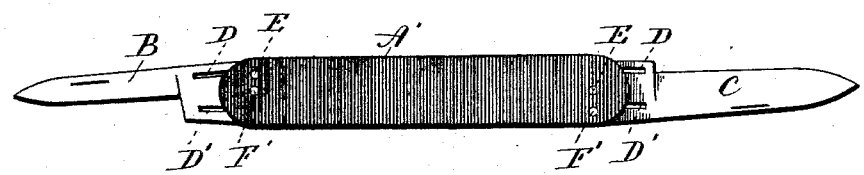
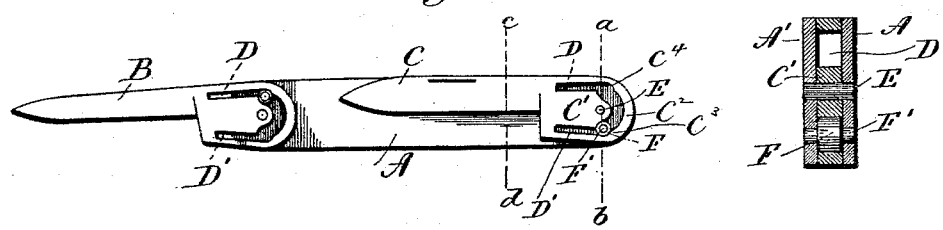 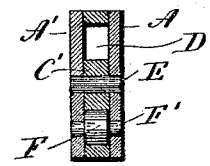
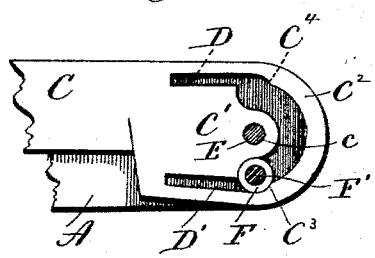 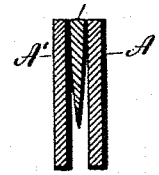 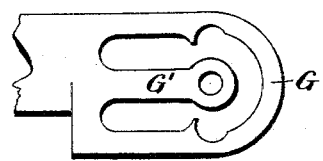
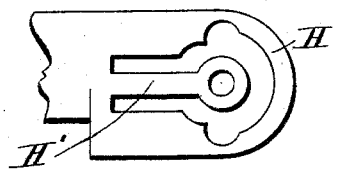 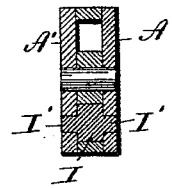
Witnesses
J. H. Shumway
Lillian D. Kelsey
George W. Miller,
Inventor
By Attys Earle Seymour

UNITED STATES PATENT OFFICE.

GEORGE W. MILLER, OF MERIDEN, CONNECTICUT.

POCKET-KNIFE.

SPECIFICATION forming part of Letters Patent No. 589,737, dated September 7, 1897.

Application filed September 28, 1896. Serial No. 607,244. (No model.)

*To all whom it may concern:*

Be it known that I, GEORGE W. MILLER, of Meriden, in the county of New Haven and State of Connecticut, have invented a new Improvement in Pocket-Knives; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a two-bladed knife constructed in accordance with my invention and showing both of its blades open; Fig. 2, a view of the knife with one member or plate of its handle removed and with its larger blade shut; Fig. 3, an enlarged view of the knife in cross-section on the line $a\,b$ of Fig. 2; Fig. 4, an enlarged broken view of one end of the knife with the near plate of its handle removed; Fig. 5, a view of the knife in transverse section on the line $c\,d$ of Fig. 2; Figs. 6 and 7, views of modified forms which the butts or tangs of the knife-blades may assume; Fig. 8, a view in transverse section of a knife constructed in accordance with my invention and provided with a solid roller coacting with the knife-blade and trunnioned in the knife-handle.

My invention relates to an improvement in pocket-knives, the object being to produce a simple, compact, strong, durable, effective, and convenient knife constructed with particular reference to securing the advantages to be gained from discarding the blade-springs ordinarily employed for holding the blades of a knife in their open and shut positions.

With these ends in view my invention consists in the combination, with a knife-handle, of a knife-blade pivoted therein and having its butt or tang cut away to form an integral spring, and means connected with the handle and engaging with the said spring for springing the same in locking the blade in its open and closed positions.

My invention further consists in certain details of construction and combinations of parts, as will be hereinafter described, and pointed out in the claims.

In carrying out my invention as shown in Figs. 1 to 5, inclusive, the knife-handle is composed of two plates or members A A', having rounded ends and of substantially the common form. Between these plates I locate two blades B and C, which are of ordinary construction except as to their butt or tang portions, which in the knife shown are alike. It will therefore be sufficient to explain the construction of the butt of the knife-blade C, in which a centrally-arranged pivot-finger C' and a bow-shaped spring $C^2$ are produced by forming a substantially semicircular slot D in the butt of the blade, as best shown in Fig. 4, the said slot having long narrow extensions D' D' to lie along the sides of the pivot-finger C'. The pivot-finger C' is formed with a perforation $c$, concentric with the slot D, for the reception of the pivot E, upon which the blade swings, the respective ends of the pivot being headed down upon the outer faces of the plates A A', as clearly shown in Fig. 3.

The integral bow-shaped spring $C^2$ of the butt of the blade is formed upon its inner edge with two locking-shoulders $C^3 C^4$, located opposite each other and near the ends of the segmental slot D, the inner wall of which is formed by the outer end of the pivot-finger C'. The blade is held in its open and shut positions by the coaction with the said shoulders $C^3$ and $C^4$ of an antifriction-roll F, which is located between the plates A and A' of the blade and which is mounted so as to rotate freely upon a pivot F', passing through the plates and headed down upon their outer faces, as shown in Fig. 3. When the blade C is in its closed position, as shown in Figs. 2 and 3, the antifriction-roll F' will be located in that end of the slot D which contains the shoulder $C^3$, with which the roll will be engaged, so as to hold the blade shut. Now if the blade is engaged in the usual manner for opening it and swung on its pivot E the shoulder $C^3$ will be forced against the antifriction-roll F with such power that the spring $C^2$ will be sprung so as to allow the roll to ride over the shoulder $C^3$, as it were, and emerge into the segmental slot, after which the blade is readily sprung into its full open position, the spring $C^2$ during this time remaining under tension or sprung; but just before the blade reaches its full open position the locking-shoulder $C^4$ rides past the antifriction-roll, which then emerges, as it were, into the extreme opposite end of the segmental slot D, after which the spring C² at once recovers and holds the shoulder C⁴ in front of the roll, so as to lock the blade in its open position. In closing the blade it must at the outset be pressed upon with sufficient force to spring its spring C² enough to get the shoulder C⁴ out of the way of the roll, after which the blade will freely swing nearly into its shut position. Then just as it goes into its fully-shut position the shoulder C³ reëngages with the roll, as shown in Figs. 2 and 4, and holds the blade closed.

It will be understood from the foregoing description and seen from the figures of the drawings referred to that by my improvement I entirely discard the independent knife-blade springs ordinarily employed in knives, whereby I secure simplicity and compactness and cheapness of construction. My improved knife also wears less than an ordinary knife, which, if not kept carefully oiled, wears to such an extent between the heel of the knife-blade butt or tang and the knife-blade spring that the latter will not hold the former positively in either its open or shut position.

In Fig. 6 of the drawings I have shown a modified construction of knife-blade butt or tang, in which the same is cut away so as to form a bow-shaped spring G and a spring pivot-finger G'.

Fig. 7 shows still another modification in which the butt or tang of a blade is cut away to form a bow-shaped spring H and a spring-pivot H', which in this case is more yielding than the spring pivot-finger of the construction shown by Fig. 6.

In Fig. 8 I have shown the substitution of an antifriction-roll and pin by a solid roll I, having integral trunnions I' I', journaled in the respective plates or members of the knife-handle. If desired, I may abandon the antifriction-roll and use merely a pin; but I prefer to use the roll in one of the two forms illustrated, inasmuch as it greatly reduces the friction of the operation of the knife.

In view of the modifications suggested I would have it understood that I do not limit myself to the exact construction herein shown and described, but hold myself at liberty to make such changes and alterations as fairly fall within the spirit and scope of my invention. Thus in manufacturing knives under my invention I may provide them with any of the tools—such as files, screw-drivers, corkscrews, &c.—that are introduced into knives. In the event of employing such instrumentalities in addition to cutting-blades their tangs will be formed in the same manner as the tangs of the cutting-blades of the knife herein described.

Having fully described my invention, what I claim, and desire to secure by Letters Patent, is—

1. The combination with a knife-handle, of a knife-blade pivoted therein, and having its butt or tang cut away to form an integral spring, and means connected with the handle and engaging with the said spring for springing the same in locking the blade in its open and closed positions.

2. In a knife, the combination with the handle thereof, of a knife-blade, the butt or tang of which is formed with an integral spring and a segmental slot, and two locking-shoulders, and a pin located in the said slot and connected with the plates for engaging with the said shoulders which lock the blade in its open and shut positions, and which spring the spring preparatory to opening and shutting the blade.

3. In a knife, the combination with the handle thereof, of a blade having its butt or tang formed with a pivot-finger, a bowed spring, and with two locking-shoulders which are located near the end of a segmental slot which separates the said pivot-finger and bowed spring; and a stationary pin fixed in the handle of the knife, and furnished with an antifriction-roll which coacts with the said spring and shoulders.

In testimony whereof I have signed this specification in the presence of two subscribing witnesses.

GEO. W. MILLER.

Witnesses:
GEORGE D. SEYMOUR,
LILLIAN D. KELSEY.